United States Patent [19]
Cannon

[11] Patent Number: 5,501,500
[45] Date of Patent: Mar. 26, 1996

[54] TRUCK BED EXTENSION APPARATUS

[76] Inventor: Paul W. Cannon, 505 Daniel La., Brandon, Miss. 39042

[21] Appl. No.: 342,252

[22] Filed: Nov. 18, 1994

[51] Int. Cl.⁶ .................................................... B60R 9/06
[52] U.S. Cl. ........................ 296/26; 108/44; 280/638; 280/78; 224/403; 224/554; 414/522
[58] Field of Search ................ 296/26, 57.1; 108/44; 280/638, 35, 639, 78; 224/402, 403, 405, 554; 414/522

[56] References Cited

U.S. PATENT DOCUMENTS 2,686,060  8/1954  Couse ................................ 296/61 X
4,932,575  6/1990  Ware .................................... 224/403
5,033,662  7/1991  Godin ............................... 296/57.1 X
5,090,335  2/1992  Russell ............................ 224/403 X

*Primary Examiner*—Dennis H. Pedder

[57] ABSTRACT

An elongated plate, shaped to fit within a pick up truck bed, extends past the end of a opened tailgate on the truck. The plate serves to extend the usable length of the truck bed. The plate is supported at a front end by two stabilizer bars, telescoping adjustable tubular supports, which extend from the forward sides of the plate up to the inner lip of the truck bed. The rear of the plate is supported by an undercarriage which is attached to the bumper by a speed connection, which locks the undercarriage to the truck bumper.

15 Claims, 3 Drawing Sheets

TRUCK BED EXTENSION APPARATUS

BACKGROUND OF THE INVENTION

This invention relates to apparatus for temporarily extending the size of the bed of a pick up truck, for carrying outsize loads.

U.S. Pat. No. 4,993,088 to Chudik discloses a truck bed extension in the form of a flat platform which rides on rollers and rails within the bed of a standard truck. The extension is deployed by lowering the tailgate and rolling the extension on its rollers to the rear of the truck. A separate set of legs is provided to provide for mechanical support when extended.

U.S. Pat. No. 2,788,137 to Harkness discloses a rearward extension for the trunk of a car or truck in the form of a roller supported tray which forms the rear floor of the truck bed or car trunk, and which can be rolled out and supported on legs to provide loading and unloading extension to the rear of the vehicle.

U.S. Pat. No. 5,116,096 to Taylor discloses a load supporting outrigger for installation on a vehicle such as a truck. The outrigger comprises a frame attached to and supported by the tow ball in the rear bumper of the truck and further supported by a cable or the like extending from the rear of the outrigger to a vertical point of attachment on the rear corners of the truck. Please note FIGS. 3 through 5 for the construction of the under frame member which is the principle support of this device. While the device is shown as being attached to the tow hitch portion of the truck, this is a standard ball fitting and there is no rigid interconnect between the truck frame and the frame of the extension support. Bouncing of the outrigger is dampened by a rubber bushing or rigid support which extends up from the forward part of the outrigger, bearing on the lower tailgate of the vehicle so as to prevent relative vertical movement between the forward end of the outrigger and the rear of the vehicle. This structure is shown in some detail in FIG. 22.

U.S. Pat. No. 4,856,840 to Hanley discloses a device for extending the bed of the truck. It comprises a particular folded metal shape at the forward end of a metal or aluminum plate. This shape catches as a lip between the lowered truck bed tailgate and the body of the truck, cantilevering support across the truck bed tailgate.

U.S. Pat. No. 3,726,422 to Zelin discloses another form of sliding luggage rack, for extension from a stopped vehicle, and supported by external legs.

U.S. Pat. No. 5,169,202 to Cupp and others discloses a work bench which may be attached to and become part of the tailgate of a truck. Note in FIG. 6 that the work bench can be extended for load support when the truck is stopped.

U.S. Pat. No. 3,877,714 to Black discloses a trailer attachment for pick-up trucks which extends load bed but does so as essentially a flat trailer supported by a rear wheel. It is connected at the forward end to a trailer hitch or the like on the vehicle.

U.S. Pat. No. 2,468,579 to Vuori shows a truck load support. A truck is provided with an extending rear bumper secured by push pins to channeled frames underneath the truck. The bumper may be pulled out to support the tailgate in a first load bearing horizontal position or pulled out further to be in line with the bed of the truck forming an extended load support bracing long loads. Note: In this latter position, the device does not provide a continuous floor but is rather simply an extended load supporting beam located level with the bed of the truck, but some distance behind the rear of the truck tailgate.

SUMMARY OF THE INVENTION

The invention comprises a elongate flat plate, which may be rubber lined, shaped to fit within a pick up truck bed, and which extends from just behind the rear wheels of the truck to past the end of a opened tailgate on the truck. The plate serves to extend the usable length of the truck bed. The plate is stabilized in position at a front end by two stabilizer bars, telescoping adjustable compression resisting tubular supports, which extend from the forward sides of the plate up to the inner lip of the truck bed. These stabilizer bars are extended to impart a stabilizing force, against the plate and the truck bed lips, holding down the front of the plate against the truck bed.

The rear of the plate is attached to the bumper by a unique speed connection. A support receiving box is attached to the rear bumper of the truck. This receiving box has external reinforcement, and is attached centrally to the bumper. The box has a flat, wide, tongue receiving opening, with a tapered entrance throat, to facilitate interconnection of the box and a undercarriage frame. Two locking screws, adjustable by T-handles, fit through the box to lock the undercarriage in place when inserted.

The undercarriage is the primary support for the extension plate. It is a string trapezoidal frame having a wide rear base and two sides tapering to a connection plate, which is sized to fit snugly within and against the support box. The plate support is connected by two vertical adjustable supports from its rear base up to the bottom rear of the extension plate. The adjustable supports hold the undercarriage a spaced distance below, and parallel to, the extension plate. This positioning of the undercarriage permits the extension plate to be slid into the truck bed, and, as the extension plate slides into the truck bed, the undercarriage tongue slides into the support box. This connection is then secured by tightening the T-handle screws; the weight of the extension plate and load then is supported by the extension plate against the truck bed in front, and by the bumper in the rear; the tailgate supports no weight.

To aid in the movement of the extension plate into position, two outrigger wheels are fit to the plate near its center of balance; these outrigger wheels support the plate at the appropriate height of the truck bed to permit the plate to be held level and rolled into position.

It is thus an object of the invention to disclose an extension plate for a pick up truck which is easily installed and removed, and which permits the transport of oversized loads.

It is a further object of the invention to disclose an extension plate for a pick up truck which does not load the tailgate of the truck.

It is a further object of the invention to disclose an extension for a pick up truck bed which can be easily installed by one person.

It is a further object of the invention to disclose an extension plate for a pick up truck which is rigidly supported in position by a quick disconnect coupling to the bumper of the truck.

It is a further object of the invention to disclose a quick engagement structure for securing the front end of a truck bed extension plate within a pick up truck.

These and other objects of the invention may be seen from the detailed embodiment disclosed below.

DETAILED DESCRIPTION OF THE INVENTION

Figure 1:
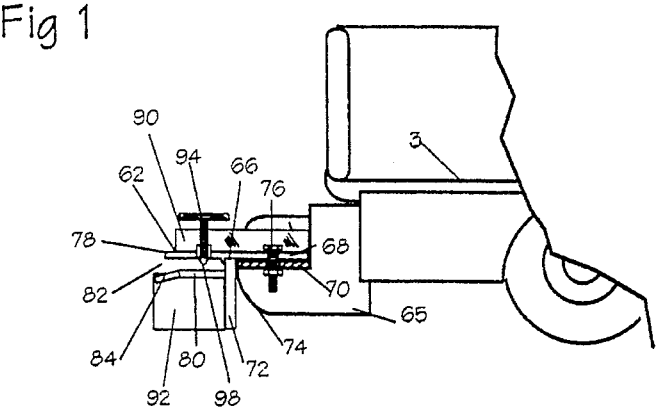
FIG. 1 is a side view of a truck showing the tongue receiving box of the invention.
Figure 2:
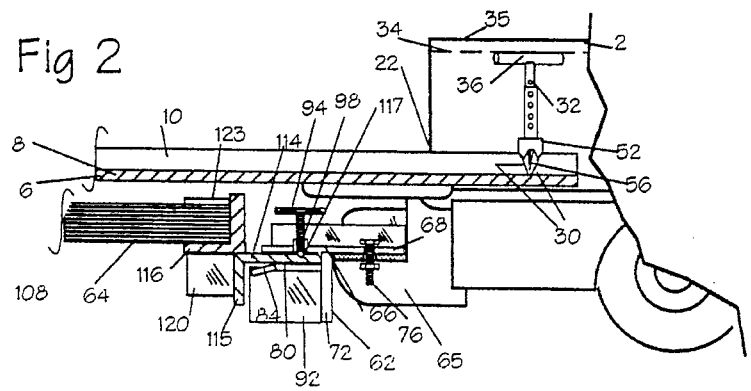
FIG. 2 is a side view of a truck rear section with the invention installed.
Figure 3:
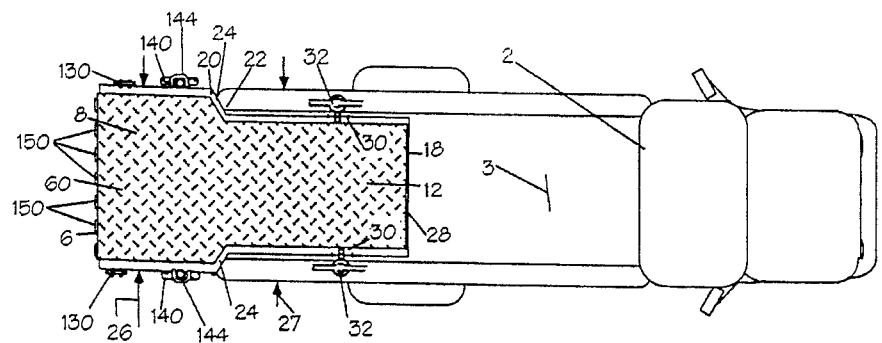
FIG. 3 is a top view of a pickup truck with the invention in place.
Figures 4, 5:
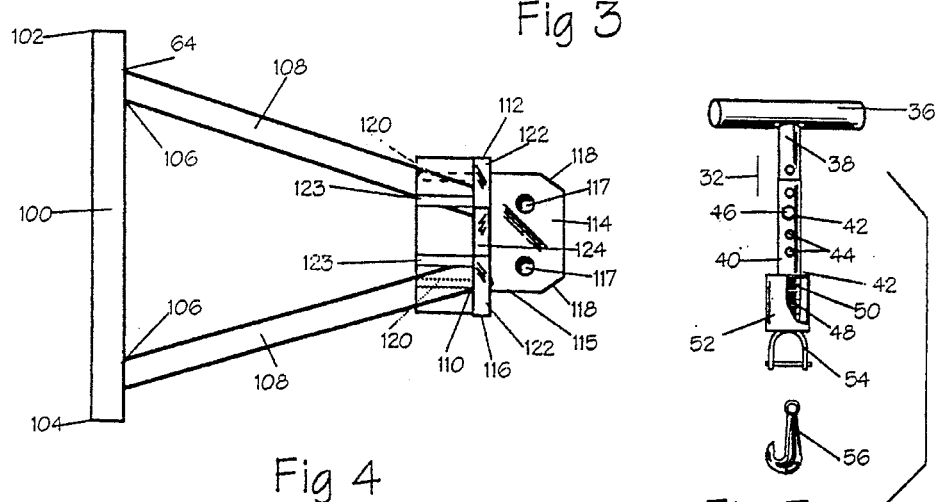
FIG. 4 is a top view of the undercarriage of the invention.
FIG. 5 is a partly exploded view of a stabilizer of the invention.
Figure 6:
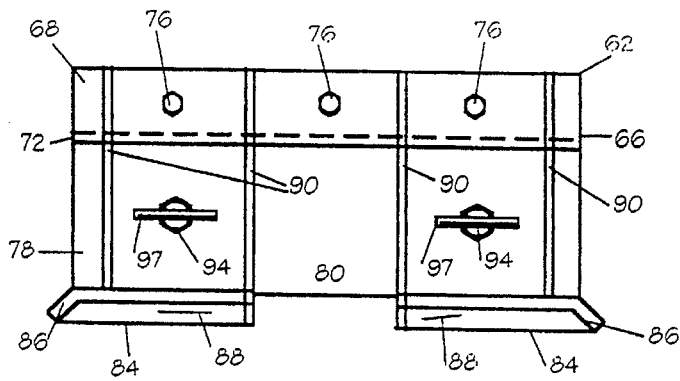
FIG. 6 is a top view of the tongue receiving box of the invention.
Figure 7:
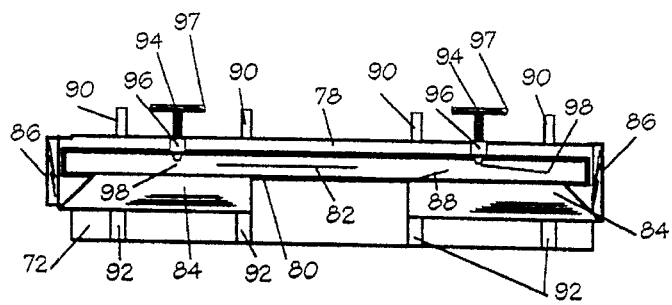
FIG. 7 is a rear view of the tongue receiving box of the invention.
Figure 8:
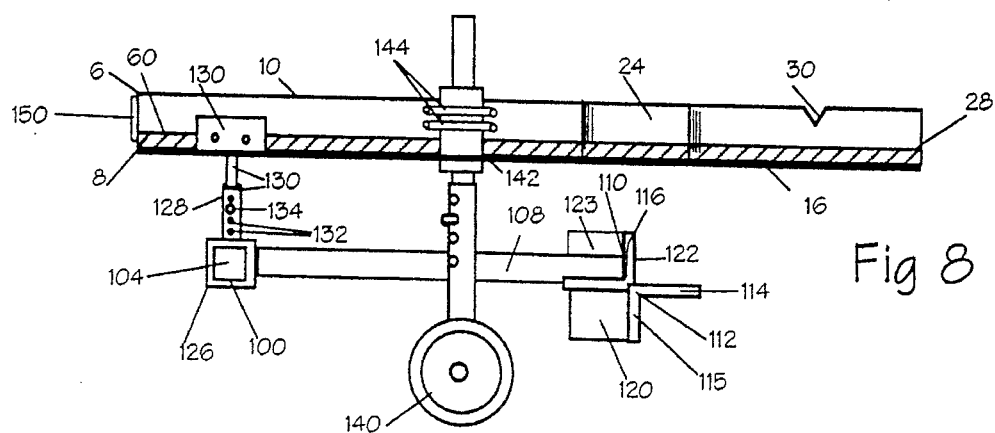
FIG. 8 is a side view of the invention.
Figure 9:
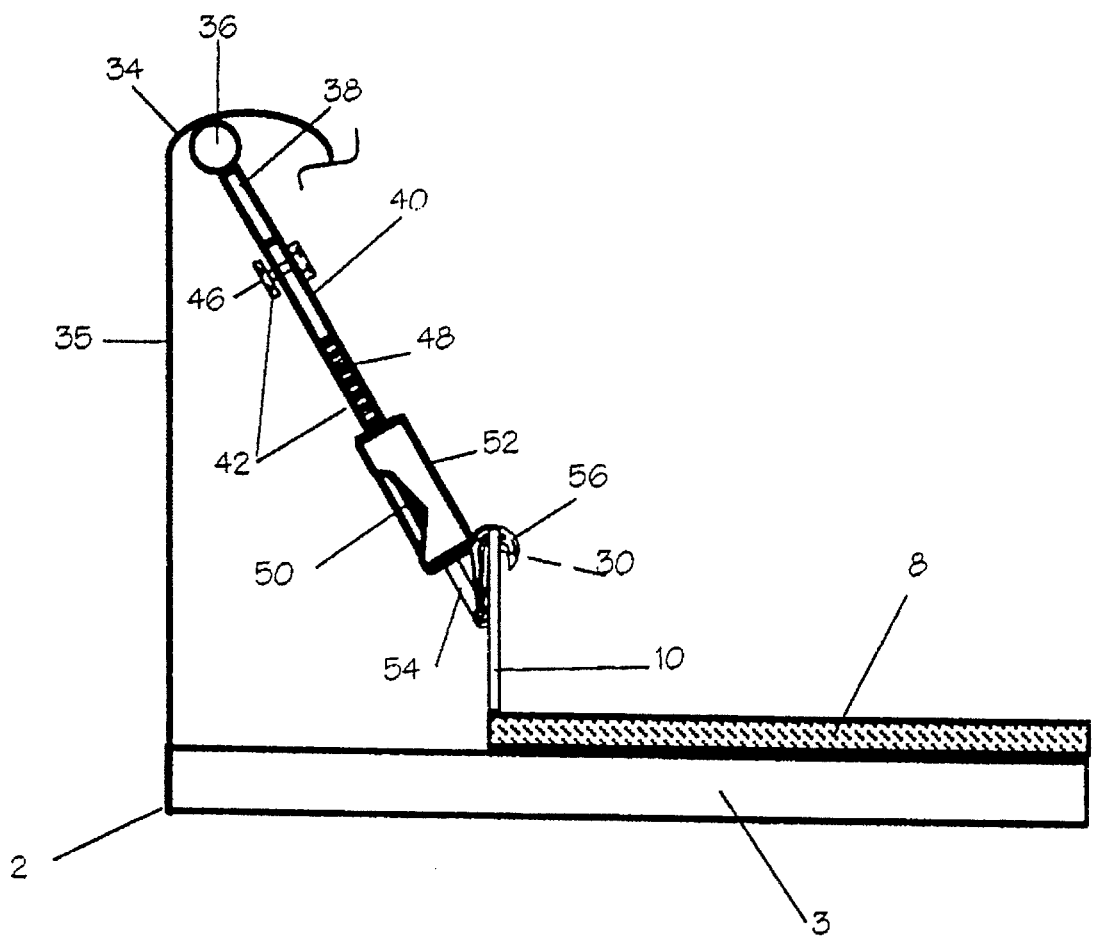
FIG. 9 is a rear section view of the stabilizer installed in a truck.

The invention is best shown and described in conjunction with a pick up truck 2 bed 3, as the invention serves to temporarily extend the length of such a pick up truck bed 3 for occasional carrying of loads which would otherwise be oversize for the pick up truck 2.

An extension plate 6 is formed as a flat plate 8, preferably metal, such as aluminum or steel for rigidity. Raised peripheral sides 10 provides stiffening to the plate 8, and the surface 12 of the plate 8 is patterned with a tread surface, as is used for metal surfaces, for additional friction. Optionally, the surface of the plate 8 may be coated with any common non skid material surfacing. An optional bottom coating 16 of rubber or plastic may be placed on the plate to prevent marring of the truck bed 3 finish.

The extension plate 6 is formed with a narrow forward end 18, of a width and a length chosen to match the interior dimensions of a pick up truck bed 3. At a point 20 on the plate 6 corresponding to the location of the tail gate supports 22 on the truck 2, the extension plate 6 widens out; the outward curvature 24 of the sides 10 is chosen to clear the rear truck bed walls 35 and tailgate supports 22, and then to widen to a width 26 substantially equal to the pick up truck exterior width 27.

Near the forward end 28 of the plate 6, on each side, a securing notch 30 or bolt hole is cut into the peripheral sides 10. Two telescoping stabilizer braces 32, one on each side of the plate 6, extend between the plate 6 and the upper lip 34 of the truck bed walls 35.

Each telescoping stabilizer 32 comprises a cross bar 36 welded or otherwise securely affixed to an upper end of a first vertical tube 38. The cross bar 36 may be coated with a protective, non marring coating, any smooth rubber or plastic material, to protect the paint finish of the truck walls 35.

The first vertical tube 38 is telescoped into a lower tube 40, and secured to the lower tube 40 by a fixture means 42 which permits the combined length of the upper 38 and lower 40 tubes to be set and fixed. This fixture 42 may be a pattern of holes 44 in each of the upper 38 and lower tubes 40, with a through bolt 46 through a chosen pair of holes 44, or it may be a continually threaded section 48 of lower tube 40 with a matching threaded section 50, or it may be any form of rachet mechanism which may be jacked and locked into position. For ease of adjustment, a combination of the bolted holes 44 and the threaded section 48 provides quick coarse adjustment of the stabilizer 32 length, and fine adjustment of the length once installed.

The lower tube 40 is supported on a base member 52 which attaches to the plate sides 10. Preferably base member 52 has an internal threading 50, engaging with a matching threaded section 48 on lower tube 40, to permit fine adjustment of the telescoping stabilizer 32 length so as to positively support the plate 6 down against the truck bed 3. A clevis 54 is affixed to the base member 52; this clevis 54 is then fastened to a swivel hook 56. The swivel hook 56 is hooked into the notch 30 in the peripheral sides 10 of the plate 6. The cross bar 36 is placed under the lips 34 of the truck bed side wall 35, and the telescoping tubes 38, 40 extended to extend the stabilizer 32 between the plate 6 and the truck bed side wall 35 lips 34. The base member 52 is then turned until the stabilizer 32 is maximally extended, holding the plate 6 forward end 28 down into the truck bed 3. The stabilizer 32 does not twist or slip against the truck wall 35, as any slippage of the stabilizer 32 would require the cross bar 36 to tilt, and the cross bar 36 cannot be tilted against the upward force of the stabilizer 32

At a rear end 60, the plate 6 is fastened to the truck 2 by a quick disconnect coupling comprising a box end 62, which usually remains fastened to the truck bumper 65, which couples to an undercarriage 64 mounted to and under the plate 6. The plate 6 and undercarriage 64 are removable from the truck 2, being installed only when needed; the Box end 62 usually remains affixed to the truck bumper 65.

The box end 62 is a tongue receiving box 62 fixed to the truck bumper 65. It comprises a inverted metal angle section 66 with a horizontal side 68, extending horizontally across the top 70 of the truck rear bumper 65. A vertical side 72 extends down against the rear 74 of the bumper 65. This angle 66 is affixed to the bumper 65 by bolting or the like; preferably three through bolts 76, through the horizontal side 68 into the bumper 65.

A top horizontal bar 78 is welded to the angle 66, extending to the rear of the angle 66, flush with the top of the angle 66 horizontal side 68. A lower horizontal bar 80 is fastened parallel to the top horizontal bar 78, extending to the rear of the vertical side 72, forming a tongue receiving slot 82, two downward angled bars 84, and two outwardly angled side bars 86 are welded to and extend from the rear of the lower horizontal bar 80 for a distance, forming a tapered entry 88 to the tongue receiving slot 82. Four flat stiffener bars 90, equally spaced, are welded to the top of the angle 66 and the top bar 78, reinforcing the connection of top bar 78 and angle 66. Four flat metal stiffener bars 92, also equally spaced, are welded to the lower bar 80 and the vertical side 72 of the angle 66, to reinforce the connection of the lower bar 80 and angle 66.

Two high strength screw bolts 94 are vertically mounted in threaded couplings 96 in the top bar 78; these screw bolts 94 extend downward into the tongue receiving slot 82 when screwed down. T handles 96, large enough to be easily manipulated by hand, are fastened to the upper ends of each screw bolt 94. The lower ends 98 of the screw bolts are tapered. It should be noted that the height of stiffener bars 90 is limited so that there is easy side access to T handles 96 by hand.

T handles 96 are provided for easy hand tightening of screw bolts 94 onto the tongue 114, as discussed below. It may be desirable for increased visibility of the truck license plate, to eliminate the T handles. In this case, screw bolts 94 would have an upper end in the form of a Hexagonal drive nut, adapted to be easily tightened and loosened by a long handle drive wrench of common design. T handles 96 are considered preferable, as no external tools are required to install or remove the invention from the truck with the embodiment described herein.

The undercarriage 64 is formed of a cross beam 100 extending the width 26 of the rear 60 of the plate 6. Cross beam 100 is preferably a hollow square cross section beam, extending from a first end 102 to a second end 104. At two points 106, each set a distance in from each end 102, 104, inwardly angled beams 108 are welded to the cross beam 100, and extend to a forward point 110 to a short parallel front side 112 where a forward extending tongue 114 is mounted.

Short front side 112 is formed of a short horizontal angle section 115 and a longer horizontal angle section 116 welded apex to apex. Tongue 114 is the forward extending side of short angle 115. It is a flat metal section, with chamfered corners 118. Tongue 114 has two counter sunk holes 117 of a diameter slightly smaller than box screw ends 98, but centered under the position of each box screw 94. The width of short angle section 115, and the length of tongue 114 is set to fit within the tongue receiving slot 82 in the box 62. Two vertical metal stiffener bars 120 are welded to the longer angle section 116 to reinforce the angle face 122. The angled beams 108 are welded to the longer angle section 116. The center of the angle face 122 is cut away to form a clearance opening 124, which provides visibility for the truck license plate when the invention is installed.

At each of the cross beam ends 102, 104, outboard of the point of welding 106 of the angled beams 108, an outer collar 126 is slid onto the cross beam 100. Collar 126 remains removable, in order to permit the undercarriage and plate to be separated for more compact packing and shipping. Collar 126 may be secured to cross beam ends 102, 104 during use, and a lock pin or lock screw will be sufficient.

A telescoping vertical support 128 extends from the outer collar 126 upwards to the plate. An angle attaching section 130 is fit to the top of the telescoping support 128, and is bolted to the plate sides 10. This telescoping support 128 is preferably two telescoping tubes 130, adjusted for vertical height by a provided pattern of holes 132, with a securing pin 134 or bolt through a pair of holes 132 to set the vertical height of the support 128. Alternatively, the tubes 130 may be adjusted by a threaded collar, so that the tubes may be screwed together to adjust height, or a ratchet or similar length adjusting mechanism. The vertical supports 128 are adjusted to bring the height of the undercarriage tongue 114 level with the box tongue receiving slot 82 when the plate is 6 horizontal and resting smoothly on the bottom of the truck bed 3. Once so adjusted, the vertical support 128 does not have to be readjusted for a particular truck unless the undercarriage 64 is removed. However, the vertical support 128 is made separable, and is the point at which the undercarriage 64 is removed from the plate 6, if this should be desirable for storage.

To aid in moving the plate 6 into engagement with a pick up truck 2, and in removing the plate 6 from the pickup truck 2, two retractable outrigger wheels 140 are mounted to the sides of the plate 6 at the point of balance 142 of the assembled plate 6 and undercarriage 64. The height of these wheels 140 is adjustable so that, when the plate 6 is balanced on the wheels 140, both the plate 6 and the undercarriage tongue 114 are level and positioned to slide easily on to the truck bed 3 and into the box tongue receiving slot 82 respectively. The design of such outrigger wheels are common, and a height adjustable wheel mechanism such as is used on boat trailers and the like is suitable. The wheels 140 are fastened preferably to the sides 10 of the plate 6 by two U-bolts 144, although any suitable method of affixing can be used, such as a welded coupling. Further, the outrigger wheels 140, since they are used only to mount and dismount the plate 6, may be removable if desired.

In use, when it is necessary to extend the length of a truck bed temporarily the assembled plate 6 and undercarriage 64 is balanced on the outrigger wheels 140, and rolled up to the rear of the truck bed 3. The truck tailgate is lowered and the plate 6 slid forward. The undercarriage tongue 114 slides into the tongue receiving slot 82, aided by the tapered entry 88. The plate 6 slides onto the truck bed 3 floor. The stabilizers 32 are then installed, by hooking the clevis hook 56 into the plate lip notches 30. The stabilizers 32 are then extended upward until the cross bar 36 is snugly fit under the truck sidewall lips 34. The threaded coupling 50 is then adjusted to snug down the forward end 18 of the plate 6; and the box vertical screws 94 are run down firmly upon the tongue 114, securing it in the slot 82. The box screws 94 tapered ends 98 fit into the tongue chamfered slots 117, bringing the tongue 114 into a tight fit within the slot 82. At this point the plate 6 is firmly mounted onto the truck 2, and forms a rigidly affixed extension of the truck bed 3. The outrigger wheels 104 are raised free of the ground level. The oversize cargo can then be loaded and transported.

Visibility of the truck license plate is assured by the cut away opening 124 in the undercarriage. In addition it is considered desirable to provide reflectors 150 on the sides and rear edge near the rear 60 of the plate 8. The entire extension plate 6 is generally below the truck rear lights, which are customarily mounted in the side walls 35 above the level of the extension plate 6. Thus use of the invention leaves safety visibility of the truck unimpaired.

When it is desired to return the truck to its usual configuration, the outrigger wheels 104 are positioned to support the plate 6. The stabilizers 32 are then collapsed to bring the cross bar free of the truck side walls, and the hook or clevis is freed from the plate sides 10. The vertical screws 94 in the box are unscrewed, raining the screws 94 free of the tongue 114. The plate and undercarriage 64 are then rolled back free from the truck on the outrigger wheels 104, and the truck is restored to its usual configuration.

It can thus be seen that the invention is of an improved extension structure, with a single plate extending beyond the length of the truck bed, and of a particular support for locking this extension plate to the truck to form a rigid extension of the truck bed. While a particular embodiment for the plate and the telescoping structures has been described, within the scope of the invention many variations in the detailed design of the telescoping structures and of the plate surface design are possible, and all are contemplated as included within the scope of the invention.

I claim:

1. An extension for a pick up truck bed comprising:

an elongate plate sized to fit from within a pick up truck bed to a position beyond the rear of the pick up truck;

a first and a second extensible telescoping brace, each extending from a forward side position on said plate up to an overhanging truck bed lip on the pick up truck, including means for extending said braces to hold said plate forward end down against said pick up truck bed;

a tongue receiving box affixed to a rear bumper of said truck;

a undercarriage affixed at a rear end to said plate, having a forward extending tongue, said tongue received and held within said box; and means for affixing said tongue into said box.

2. The apparatus of claim 1 further comprising:

said plate having a narrower forward end sized to fit a width of said pick up truck bed;

said plate expanding to a greater width in the rear portion thereof;

said plate having a reinforcing, upwardly extending edge on each side thereof.

3. The apparatus of claim 1 further comprising:

said telescoping brace comprising:
a cross bar, adapted to fit under said truck bed lip, affixed to a tube;
said tube having a threaded lower end:
a base having a threaded coupling, receiving said lower end, said threaded coupling expanding the length of said tube against said base to press down said plate.

4. The apparatus of claim 3, said tube further comprising:

an upper tube having a sliding fit into a lower tube section;

means for affixing said upper and said lower tube together, setting thereby an approximate height of said brace.

5. The apparatus of claim 4, said means for affixing further comprising:

said upper tube and said lower tube having a plurality of periodic holes therein;

a removable pin passing through one set of holes in said upper tube and one set of holes in said lower tube.

6. The apparatus of claim 3, said base further comprising:

a swivel hook;

mating to a hook receiving recess in said plate reinforcing edge.

7. The apparatus of claim 1, said box further comprising:

a length of angled plate having a horizontal plate edge welded to a vertical plate;

said horizontal plate affixed to a top section of said bumper, said vertical plate being supported against a rear face of said bumper;

a first horizontal extension extending to the rear of said horizontal plate;

a second horizontal plate spaced a distance below said first horizontal extension;

at least one angled entrance plate fastened to and extending rearward from the rear of said second horizontal plate, said first horizontal extension and said second horizontal plate forming a tongue receiving slot; and means for removably fastening a tongue within said slot.

8. The apparatus of claim 7, said means for removable fastening further comprising:

at least one adjustable screw, received in a threaded coupling within said horizontal extension, having a first position above said slot and a second position within said slot against said second horizontal plate; and an elongated T-handle affixed to the top of said screw for rotation of said screw.

9. The apparatus of claim 7 further comprising:

a plurality of vertical reinforcing plates welded between said second horizontal plate and said vertical plate.

10. The apparatus of claim 1 said undercarriage further comprising:

a rear cross beam, having a first and second end;

a first side beam and a second side beam, each extending from a point near one end of said rear cross beam to a forward end thereof, said side beams being angled together;

a tongue affixed to the forward ends of said side beams, adapted to fit said tongue receiving box; and means for supporting said undercarriage horizontally under said plate.

11. The apparatus of claim 10, said means for supporting said plate. undercarriage further comprising:

for each of said first end and said second end of said rear cross beam;

a sleeve fit around said end;

a vertical tubular section affixed to said sleeve;

a second tubular section fit within said vertical tubular section;

an angled plate affixed to a top end of said second tubular section;

said angled plate bolted to a plate reinforcing edge of the elongate plate; and means for adjusting the length of said vertical tubular sections.

12. The apparatus of claim 11 said means for adjusting the length of said vertical tubular sections further comprising:

A pattern of holes in said vertical tubular sections; and a lock pin extending through a chosen pair of said holes, locking said tubular sections into a fixed length.

13. The apparatus of claim 1 further comprising:

a first telescoping wheel support removably affixed to a first side of said plate at the center of balance thereof;

a second telescoping wheel support removable affixed to a second side of said plate at the center of balance thereof.

14. An extension for a pick up truck bed comprising:

an elongate plate sized to fit from within a pick up truck bed to a position beyond the rear of the pick up truck;

said plate having a narrower forward end sized to fit a width of said pick up truck bed;

said plate expanding to a greater width in the rear portion thereof;

a first and a second extensible telescoping brace comprising:
a cross bar, adapted to fit under said truck bed lip, affixed to a tube;
said tube having a threaded lower end:
a base having a threaded coupling, receiving said lower end, said threaded coupling expanding the length of said tube against said base to press down said plate;
each said brace extending from a forward side position on said plate up to an overhanging truck bed lip on the pick up truck, including means for extending said braces to hold said plate forward end down against said pick up truck bed;

a tongue receiving box comprising:
a length of angled plate having a horizontal plate edge welded to a vertical plate;
said horizontal plate affixed to a top section of a bumper on said truck, said vertical plate being supported against a rear face of said bumper;
a first horizontal extension extending to the rear of said horizontal plate;
a second horizontal plate spaced a distance below said first horizontal extension;
at least one angled entrance plate fastened to and extending rearward from the rear of said second horizontal plate, said first horizontal extension and said second horizontal plate forming a tongue receiving slot; and means for removably fastening a tongue within said slot;

a undercarriage comprising:
    a rear cross beam, having a first and a second end;
    a first side beam and a second side beam, each extending from a point near one end of said rear cross beam to a forward end thereof, said side beams being angled together; vertical plate;
    a tongue affixed to the forward ends of said side beams, adapted to fit said tongue receiving box; and
    means for supporting said undercarriage horizontally under a rear section of said plate; and
    means for affixing said tongue into said box.

15. The apparatus of claim 14, said means for supporting said undercarriage comprising:

for each of said first end and said second end of said rear cross beam:

a sleeve fit around said end;

a vertical tubular section affixed to said sleeve;

an angled plate affixed to a top end of said vertical tubular section;

said angled plate bolted to a plate reinforcing edge of the elongate plate; and means for adjusting the length of said vertical tubular section.

* * * * *